April 23, 1929.   J. T. LOVETT, JR   1,709,860
PLANT BALL PACKAGE
Filed Jan. 27, 1928
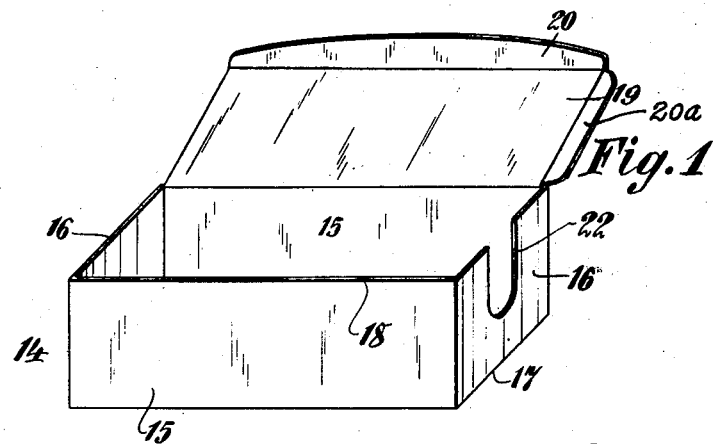
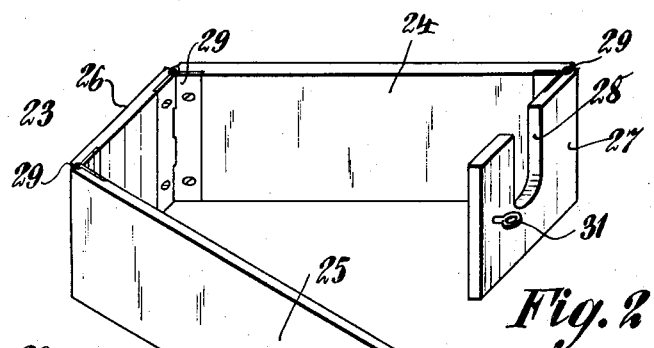
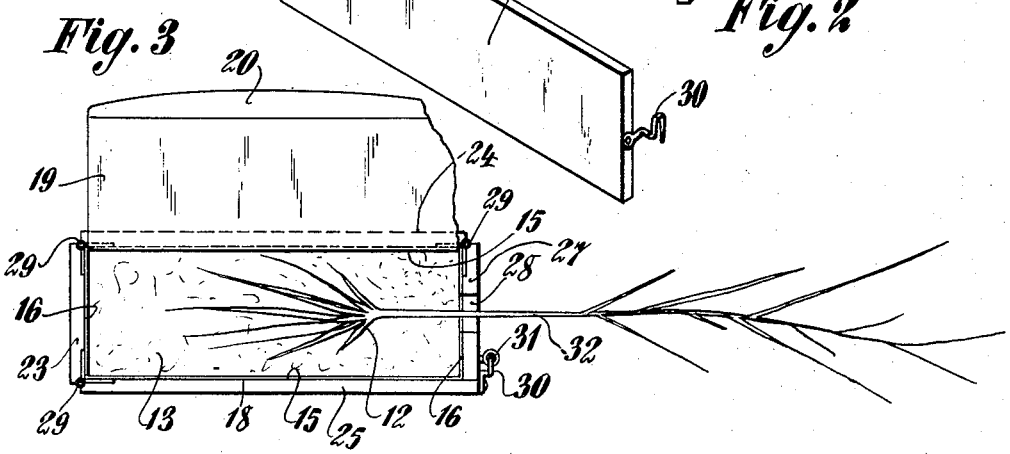
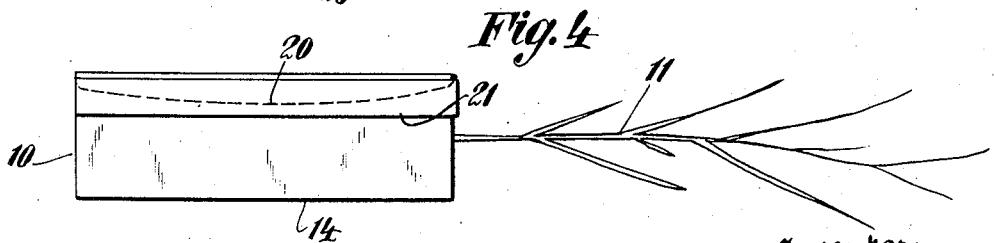
Inventor:
J. T. Lovett, Jr.
Attorney Patented Apr. 23, 1929.

1,709,860

UNITED STATES PATENT OFFICE.

JOHN THOMPSON LOVETT, JR., OF LITTLE SILVER, NEW JERSEY.

PLANT-BALL PACKAGE.

Application filed January 27, 1928. Serial No. 249,874.

This invention has reference to potted plants.

Among the objects of this invention is the provision of an improved means to facilitate the safe and convenient handling and transportation of a plant.

Another object of this invention is to produce a device of the character described, in which the so-called "ball" of a plant, comprising the roots thereof and the therewith associated earth mass, is enclosed in a light, inexpensive container, which is later discarded.

A further object of this invention is to provide a device of the type set forth, including a temporary container to receive the "ball" of the plant, and likewise an extra quantity of earth or humus sufficient to meet all requirements when the plant is later transferred to the open ground or pot.

A still further object of the invention is to furnish a container for the purpose specified, which possesses strength and water-proof quality.

Still another object of the invention is the production of a device of the class described, in which a mould or re-enforcement is provided for the container to permit the earth or humus to be tamped thereinto with a moderate degree of pressure and which re-enforcement is then removed, and the container closed for the purpose set forth.

Other objects will in part be evident, and in part pointed out hereinafter.

The invention accordingly consists in the arrangement and combination of parts as shown, and the scope thereof will be indicated in the following claims.

In the drawings,

Figure 1 is a perspective view of a container, employed in my invention.

Fig. 2 is a similar view of a mould in open position.

Fig. 3 is a plan view showing the container in course of being filled, and the mould surrounding the same.

Fig. 4 is a plan view looking at a side of the container, with the mould removed, and showing an embodiment of the invention.

Referring in detail to the drawing, 10 denotes a device embodying the invention. The same includes a plant 11 having the roots 12 and associated earth mass 13 enclosed within a container 14. The latter may consist of any light strong material, and which is preferably water-proof. Accordingly, the plant can be handled with safety and convenience, and easily transported. A sufficient quantity of moisture may be in the earth 13 to keep the plant alive for a considerable period of time. Owing to the water-proof quality of the container, the water will not weaken or disintegrate the same, while evaporation of the water will be decreased. The container 14 may be of ample size to permit all the earth or humus ordinarily required for the plant 11 to be shipped along with the plant, so that when the latter is transferred to the open ground or pot, according to the usual practise, sufficient earth may be directly available. On the other hand, the container, owing to its light construction adds practically nothing to the weight of the device.

Preferably, the said container may consist of a fairly tough fibrous material, as, for example, paper. This may be impregnated with asphaltum, tar, paraffin, or the like. The container may be of box form, having sides 15, ends 16, a bottom 17, and an open top 18, adapted to be closed by a cover 19. The said cover may be formed with flaps 20 and 20ª, over which an adhesive strip 21 may be pasted to securely close the container. In one end of the container a cut out 22 is made to receive the stem of the plant 11 as will be hereinafter described.

A mould or re-enforcement 23, which may be made of wood, or metal is provided to temporarily enclose the container 14 around the sides and ends of the same. The said mould may be of portable construction as shown, and comprises side portions 24, 25 and end portions 26, 27 corresponding to the respective sides and ends of the container 14. The end 27 is formed with an opening 28 to register with the similar opening 22 in the container. The several portions of the mould are hingedly connected together at 29, and a hook 30 engaging in an eye member 31, make the mould an effective re-enforcement for the said container.

The manner of use of the invention will now be clearly apparent. With the container 14 positioned in the mould 23, a plant 11 is placed with its roots in the said container and its stem 32 projecting through the communicating end openings 22 and 28. A quantity of earth or humus is then added into the container and tamped down. Thereafter the hook 30 is released, and the mould removed. The cover 19 is then closed and sealed, after which the device is ready for shipment.

It is seen that I have provided a device that fulfills the several objects of the invention and is well adapted to meet the conditions of practical use, being inexpensive and efficient.

I claim:

1. A plant ball package of the character described, including a container made of a single piece of pliable material of a waterproof nature, said container having end and side walls, one of the side walls being hinged to constitute a flap which can be opened to form a side opening in the container, through which opening the ball of a plant can be placed into the container, an end wall of the container being slotted to receive the stem of the plant, the said flap having a projecting end portion to take over the slotted end wall of the container in the closed position of the flap to retain the stem in central position in the container.

2. A plant ball package of the nature set forth, comprising a container made of a light, pliable, waterproof material, said container having a bottom, end and side walls, said container having an open top, and a hingedly mounted cover for said open top, one of the end walls having an opening for the stem of a plant, the ball of which is received in the container, and the cover being sealed to the container in closed position.

3. A plant ball package of the type set forth, including a container of pliable material of a waterproof nature, said container being substantially rectangular in form, and having a side wall hingedly mounted to constitute a flap for opening or closing the container, an end wall of the container having a slot to receive the stem of a plant, said flap being flat and coextensive in size with the container but having a projecting end portion to take over the slotted end wall up to the stem of the plant and retain the stem in central position in the container.

4. A plant ball package of the character described, including an elongated container of pliable waterproof material to receive the ball of a plant, said container having a wall hingedly mounted to form a flap extending lengthwise of the container for opening or closing the same, said container having a slot at an end thereof to receive the stem of the plant coincident with the insertion of the ball of the plant into the container through the flap opening.

In testimony whereof I affix my signature.

JOHN THOMPSON LOVETT, Jr.